US007836514B2

(12) United States Patent
Kim et al.

(10) Patent No.: US 7,836,514 B2
(45) Date of Patent: Nov. 16, 2010

(54) METHOD, APPARATUS AND COMPUTER PROGRAM FOR PROCESSING MULTIMEDIA DATA SIGNALS

(75) Inventors: Seo-Kyu Kim, Seoul (KR); Mi-Jung Noh, Yongin-si (KR); Tae-Su Kim, Hwaseong-si (KR); Jung-Sook Lee, Suwon-si (KR); Hyun-Min Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1676 days.

(21) Appl. No.: 10/921,818

(22) Filed: Aug. 20, 2004

(65) Prior Publication Data

US 2005/0047404 A1 Mar. 3, 2005

(30) Foreign Application Priority Data

Aug. 27, 2003 (KR) ................. 10-2003-0059491

(51) Int. Cl.
*H04L 12/56* (2006.01)
(52) U.S. Cl. .................. 726/30; 713/151; 713/160; 713/192; 709/232; 386/E5.001; 380/42; 375/E7.009; 370/382; 370/389; 370/412; 348/E5.004; 348/E7.061
(58) Field of Classification Search ................ 726/30
See application file for complete search history.

(56) References Cited

U.S. PATENT DOCUMENTS 5,303,302 A * 4/1994 Burrows ................. 713/161

(Continued)

FOREIGN PATENT DOCUMENTS

JP    2001-135017    5/2001

(Continued)

OTHER PUBLICATIONS

Nishimoto, Y., et al, 'A Digital Rights Management System for Digital Broadcasting Based on Home Servers', IEEE Transactions on Broadcasting, vol. 52, No. 2, Jun. 2006, entire document, http://ieeexplore.ieee.org/stamp/stamp.jsp?arnumber=01634771.*

(Continued)

*Primary Examiner*—Edan Orgad
*Assistant Examiner*—Ronald Baum
(74) *Attorney, Agent, or Firm*—Harness, Dickey & Pierce, P.L.C.

(57) ABSTRACT

An apparatus, method and a computer program for processing multimedia data is described, where the apparatus may include an input switch which may receive a plurality of transport stream packets corresponding to a plurality of digital multimedia data signals input thereto, and a packet identification (PID) filter unit which may selectively output a given set of TS packets to be demultiplexed from the received plurality of TS packets. A buffer and/or an external memory device may store at least some of the TS packets of the output given set. A conditional access/content protection (CA/CP) unit may read and decrypt the TS packets stored in the buffer, and may encrypt at least some of the decrypted TS packets for storage in the external memory device if the buffer becomes full, to prevent the TS packets to be stored in the external memory device from being copied.

11 Claims, 1 Drawing Sheet

U.S. PATENT DOCUMENTS

| | | | |
|---|---|---|---|
| 6,269,107 B1* | 7/2001 | Jong | 370/535 |
| 6,697,902 B1 | 2/2004 | Sugimoto | |
| 6,801,536 B1* | 10/2004 | Foster et al. | 370/412 |
| 7,006,756 B1* | 2/2006 | Keesen et al. | 386/85 |
| 7,295,755 B2* | 11/2007 | Ostermann et al. | 386/52 |
| 2002/0037160 A1* | 3/2002 | Locket et al. | 386/111 |
| 2002/0108037 A1* | 8/2002 | Baker | 713/168 |
| 2002/0114360 A1 | 8/2002 | Perlman | |
| 2003/0061477 A1 | 3/2003 | Kahn et al. | |
| 2003/0110513 A1* | 6/2003 | Plourde et al. | 725/134 |
| 2003/0189957 A1* | 10/2003 | Misu et al. | 370/536 |
| 2004/0177369 A1* | 9/2004 | Akins, III | 725/31 |

FOREIGN PATENT DOCUMENTS

| | | |
|---|---|---|
| KR | 1020020006990 | 1/2002 |
| WO | WO 01/74003 | 4/2001 |

OTHER PUBLICATIONS

Preliminary Search Report received by the French Patent Office on Apr. 2, 2010 in corresponding French application.

* cited by examiner

METHOD, APPARATUS AND COMPUTER PROGRAM FOR PROCESSING MULTIMEDIA DATA SIGNALS

PRIORITY STATEMENT

This application claims the priority of Korean Patent Application No. 2003-59491, filed on Aug. 27, 2003, in the Korean Intellectual Property Office, the disclosure of which is incorporated herein in its entirety by reference.

BACKGROUND OF THE INVENTION

1. Field of the Invention

The present invention relates, in general, to a method, apparatus and computer program for processing multimedia data signals.

2. Description of the Related Art

Since the beginning of the digital era, there has been a demand for devices that can simultaneously receive a variety of broadcasting signals and process multimedia data such as IEEE1394 data, universal serial bus (USB) data, national renewable security system (NRSS) data, and personal video recording (PVR) data. Also, since these broadcasting signals and multimedia data are in digital form, they may be susceptible to illegal copying, with the popularity and improvement of the Internet. Accordingly, conditional access/content protection of such data is desired.

In conventional multiple multimedia data signal receiving and recording devices, encrypted digital multimedia signals may be decrypted by several conditional access (CA) units, so that the decrypted content within the signal (a signal is sometimes referred to as a stream) may be viewed on a suitable display such as a digital television. In a case where delayed access (i.e., time shifting) is required, the decrypted content may be recorded in a recording medium and then can be viewed at a later time.

However, if multiple data streams (or signals) are input, conventional receive and record devices can process only a limited number of inputs. In a case of delayed access or recording, since data is not encrypted, problems such as illegal copying may occur. Also, since the size of a buffer which receives external digital multimedia data signals and stores the data may be typically fixed, if the buffer is full, data may be lost. Furthermore, since direct memory access (DMA) is required to directly select an input/output (IO) device when data is recorded, the IO device may have substantial communication overhead.

SUMMARY OF THE INVENTION

Exemplary embodiments of the present invention, in general, are directed to an apparatus, method and a computer program for processing multimedia data. An exemplary apparatus may include a transport stream (TS) input switch unit which may receive a plurality of TS packets corresponding to a plurality of digital multimedia data signals input thereto, and a packet identification (PID) filter unit which may selectively output a given set of TS packets to be demultiplexed from the received plurality of TS packets. A buffer of the apparatus and/or an external memory device in communication with the apparatus may be configured to store at least some of the TS packets of the output given set. The apparatus may include a conditional access/content protection (CA/CP) unit. The CA/CP unit may read and decrypt the TS packets stored in the buffer, and may encrypt at least some of the decrypted TS packets for storage in the external memory device if the buffer becomes full, in an effort to prevent the TS packets to be stored in the external memory device from being copied.

BRIEF DESCRIPTION OF THE DRAWINGS

The present invention will become more apparent by describing, in detail, exemplary embodiments thereof with reference to the attached drawing, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 1:
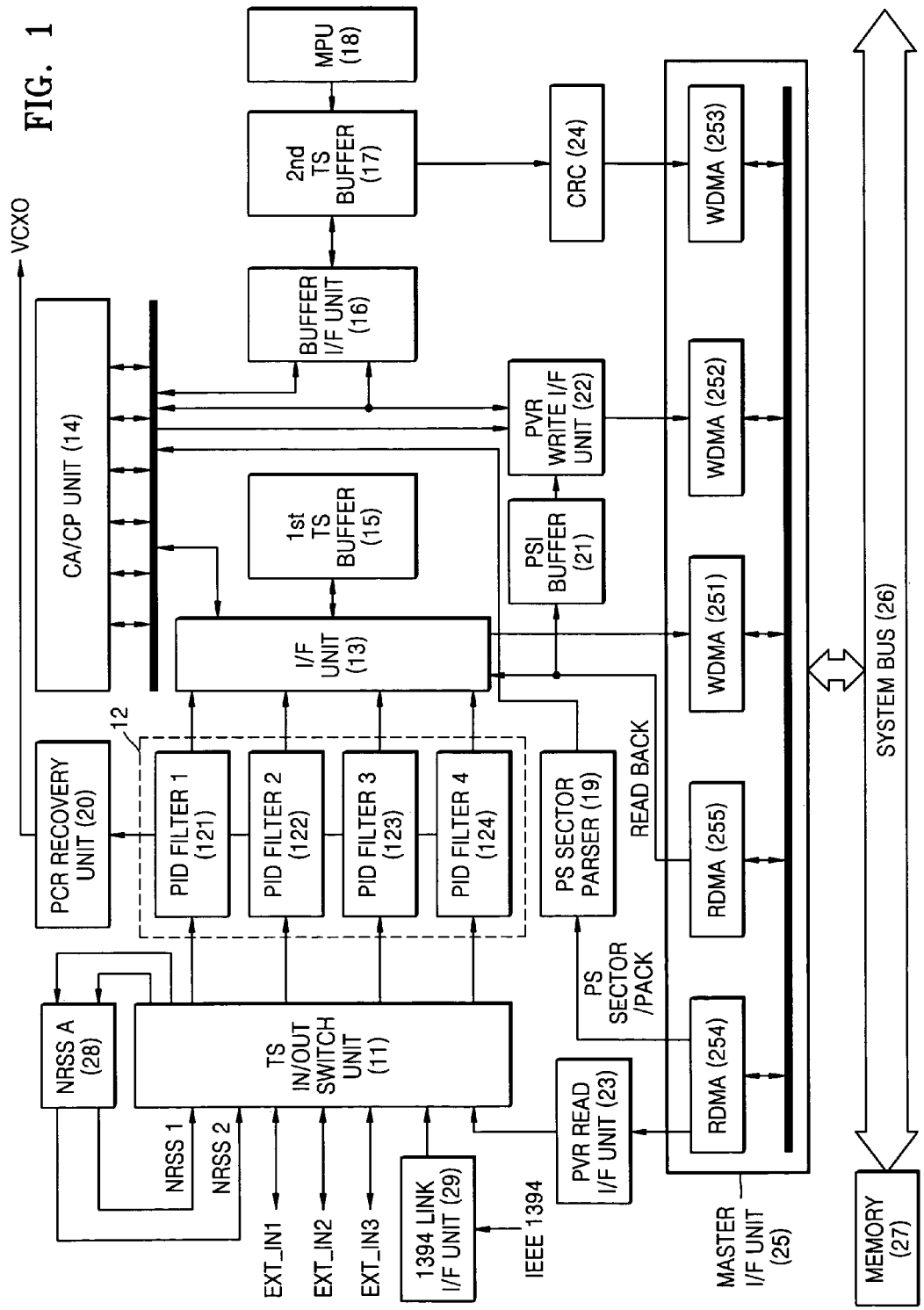
FIG. 1 is a block diagram of a multiple multimedia data receiving and recording apparatus according to an exemplary embodiment of the present invention.

FIG. 1 is a block diagram of a multiple multimedia data receiving and recording apparatus according to an exemplary embodiment of the present invention. FIG. 1 also is provided to describe an exemplary method of processing multimedia data streams (or signals) received at the exemplary apparatus.

Referring to FIG. 1, a multiple multimedia data receiving and recording apparatus, hereafter 'apparatus' may include a packet identification (PID) filter unit 12. The PID filter unit 12 may include a plurality of PID filters 121-124. The apparatus may include a master interface unit 25. Master interface unit 25, which also may be referred to as a memory interface unit, may include write DMAs 251-253 and read DMAs 254 and 255, to be described in further detail below.

The apparatus may also include a transport stream (TS) input switch unit 11, an interface unit 13 and a conditional access/content protection (CA/CP) unit 14. The TS input switch unit 11 may receive multiple digital multimedia data signals (embodied as transport streams (TSs), for example) that are input through a plurality of input terminals, and may selectively output the digital multimedia data signals to the PID filter unit 12. In an example, the multiple digital multimedia data signals may be represented as a plurality of encrypted TV channels. The data passed through the PID filter unit 12 may be lined up and passed through the interface unit 13, to be input on a single path to the CA/CP unit 14 to be decrypted, and may be output to an external recording device or a display unit (not shown). Each of the arrows of FIG. 1 indicates the signal flow direction. Thus, as will be seen further below in accordance with the exemplary embodiments, a plurality of received multimedia data signals may be simultaneously decrypted and viewed, since several digital multimedia data signals may be received through a single input path based on time-sharing principles.

FIG. 1 illustrates an exemplary number of transport stream (TS) packets as four (4), and accordingly, the number of PID filters 12 may be four, for example. However, it is within the ordinary skill of the art to process greater or fewer numbers of TS packets and PID filters than four. The TS input switch unit 11 may receive serial/parallel channel input signals EXT-IN1 through EXT-IN3. Additionally, the TS input switch unit 11 may receive signals NRSS1 and NRSS2 input from a national renewable security system (NRSS) A 28, an IEEE1394 signal input through an IEEE1394 link interface unit 29, and a PVR read signal input through a PVR read interface unit 23, as shown in FIG. 1. Further, the TS input switch unit 11 may output serial/parallel channel input signals EXT-IN1 through EXT-IN3 to the NRSS A 28.

The PID filter unit 12 may selectively pass only those packets from a plurality of TS packets input through the TS input switch unit 11 that are to be demultiplexed. In other words, if desired PID and service channel identification (SCID) values have been set in registers of the PID filters 121-124, those packets with the set PID and SCID values (of the plurality of TS packets input from the channels through the TS input switch unit 11) may be passed through the PID filter unit 12.

The interface unit 13 may receive the four TS packets and may forward the TS packets for sequential storing in the first TS buffer 15 (i.e., the first TS buffer 15 may sequentially store the four exemplary TS packets that have been lined up for input at interface unit 13). The CA/CP unit 14 may simultaneously read and decrypt the TS packets stored in the first TS buffer 15 via interface unit 13. In an example, if the first buffer 15 becomes full with decrypted TS packets, one or more of the decrypted TS packets received via PID filter 12 and interface 13 may be recorded in an external recording medium instead of first TS buffer 15. In this case, the CA/CP unit 14 may encrypt the 'additional' or 'overflow' decrypted TS packets so as to prevent the decrypted TS packets that are to be stored in a memory of the external recording medium from being copied, for example.

Accordingly, several encrypted TS packets (which may be representative of several encrypted TV channels, for example) may be simultaneously decrypted by CA/CP unit 14 and viewed on a suitable display device operatively connected to the exemplary apparatus. This may be possible since several digital multimedia signals may be received through a single input path (between interface unit 13 and first TS buffer 15, for example) in accordance with time-sharing principles (i.e., the TS packets may be time-multiplexed so as to be sequentially stored in first TS buffer 15.

The CA/CP unit 14 may also be referred to as a de-scrambler/scrambler, and may be configured to support several decryption and encryption algorithms for conditional access and content protection. As such decryption and encryption algorithms are known to those of ordinary skill in the art, a detailed description thereof is omitted for reasons of brevity. The CA/CP unit 14 may be designed so as to be able to process some and/or all of the exemplary four TS packets of FIG. 1, for example.

In a case where the first TS buffer 15 is full, a portion of the TS packets output from the PID filter unit 12 (for example, a TS packet output from the fourth PID filter 124 and/or TS packets output from the third PID filter 123 and the fourth PID filter 124) may be stored in an external memory device 27 via the interface unit 13, the write DMA 251, and an external system bus 26.

The external memory device 27 may be embodied as a medium that is built in or installed in the exemplary apparatus, or may be a removable medium arranged so that it can be separated from the exemplary apparatus. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

The TS packets stored in the external memory device 27 may be accessed for a read back process, so as to be decrypted and viewed on a suitable display device, for example. Accordingly, as the external memory device 27 is available in addition to the first TS buffer 15, potential overflow of the first TS buffer 15 will not cause data to be lost prior to or upon reading by the CA/CP unit 14.

In the case that a read back process is implemented, the TS packets stored in the first TS buffer 15 may be initially read and used by the CA/CP unit 14. In other words, CA/CP unit 14 may either decrypt the encrypted TS packets stored in the first TS buffer 15 and/or may decrypt the TS packets if the packets are stored in an external recording medium. After the TS packets in the first TS buffer have been accessed, the TS packets stored in the external memory device 27 may be read back to the CA/CP unit 14, via the external system bus 26 and the read DMA 255. In other words, any overflow TS packets stored in external memory device 27 may be read back from the external memory device 27 and utilized by the CA/CP unit 14, such as to be decrypted by the CA/CP unit 14 for viewing on a suitable display device, for example.

In an example, the first TS buffer 15 may be embodied as a dual port SRAM, although the exemplary embodiments are not limited to this memory configuration, and may be embodied by other types of rewriteable non-volatile memory evident to those of ordinary skill in the art, such as other types of RAM, ROM, flash memories, hard disks, etc.

Accordingly, in an exemplary embodiment, there is provided a method for preventing copying of multimedia data signals that are to be recorded in an external recording medium. As discussed above, a plurality of transport stream (TS) packets representing one or more input multimedia data signals (such as a plurality of TV channels) may be decrypted and stored in a buffer (such as TS buffer unit 15) until the buffer is full. Any overflow decrypted TS packets that cannot be stored in the buffer may be re-encrypted by the CA/CP unit 14 prior to storage in an external memory such as external memory device 27. Upon a read back process, the decrypted TS packets stored in the buffer are initially accessed by the CA/CP unit 14 so as to be processed for eventual viewing on a suitable display device, or encrypted for a recording process, for example. Accordingly, encrypting input multimedia signals of a TV channel prior to recording the signals may prevent illegal copying, potentially preventing persons from decrypting the signals when transmitting and copying the signals to other people.

In another exemplary embodiment, there is provided a method for allocating multimedia data signals within an apparatus configured to process the signals, such as the exemplary apparatus of FIG. 1. For example, a plurality of TS packets representing one or more received input multimedia data signals may be stored in a suitable first memory (such as TS buffer unit 15, for example) until the first memory is full. Any overflow or additional TS packets may be stored in a second memory (such as external memory device 27) so as to avoid and/or reduce the probability of data loss (loss of TS packets). Thus, even with a fixed capacity memory or buffer, the additional memory provided may reduce and/or possibly eliminate the potential for multimedia data signals to be lost or (TS packets to be dropped).

Referring again to FIG. 1, a second TS buffer 17 may receive output signals from the CA/CP unit 14. In other words, encrypted TS packets may be sequentially passed through the TS input switch unit 11, the PID filter unit 12, the interface unit 13, the CA/CP unit 14 (where the TS packets may be decrypted or may remain encrypted for storage) and buffer interface unit 16, so as to be stored in second TS buffer 17. Second TS buffer 17 may also store decrypted TS packets received from the CA/CP unit 14. Second TS buffer 17 may provide further additional storage space to store multimedia data that is to be decrypted for immediate viewing on a suitable display device. in an effort the provide further flexibility for the exemplary apparatus. As an example, the second TS buffer 17 may store audio/video stream information parsed by a micro-processing unit (MPU) 18, as shown in FIG. 1.

Referring to FIG. 1, the MPU 18 may read the TS packets stored in the second TS buffer 17 one by one, for example, and may demultiplex the TS packets. A microprocessor is merely an exemplary processor, MPU 18 may be embodied by any equivalent digital processor such as a DSP, one or more microcontrollers under central processing control, and or one or more application specific integrated circuits (ASICs), The MPU 18 may be configured to abstract and classify given data in the TS packets, and may transmit the data to a designated memory. Since the MPU 18 may control data abstraction, classification and transmission using software, flexibility of the apparatus increases.

Additionally, if the second TS buffer 17 stores encrypted TS packets, MPU 18 may direct a recording operation in which the stored TS packets (that have been scrambled by the CA/CP unit 14 or which were passed through the CA/CP unit 14 as encrypted) may be sent by second TS buffer 17, via CRC 24, write DMA 253 and system bus 26 to an external storage medium such as external memory device 27. CRC 24 performs a cyclic redundancy error code check to determine if there are any errors in the TS packets.

A program stream (PS) sector parser 19 may be configured to abstract only a sector header from a program stream of a digital versatile disk (DVD) input from the read DMA 254 and then may output the program stream to the CA/CP unit 14. The CA/CP unit 14 may analyze the contents of the received program stream.

The apparatus may also include a program clock reference (PCR) recovery unit 20. PCR recovery unit 20 may store PCR data abstracted by an abstraction packet module (not shown for reasons of clarity) in the PID filter unit 12. The PCR recovery unit 20 may control a system timer clock (STC) (not shown) so that the STC is immediately initiated as modes (i.e., time stamp values) are changed. In other words, the PCR recovery unit 20 may use time stamp values passed through PID filters 121-124 during a PCR recovery. For example, a 'first mode' means that a time stamp value passed through the first PID filter 121 is used during a PCR recovery; a 'second mode' represents that a time stamp value passed through the second PID filter 122 is used during a PCR recovery, etc. The PCR recovery unit 20 may thus control the STC by storing the PCR data of several channels. If the current abstracted PCR data is presently being displayed, the PCR recovery unit 20 may perform pulse width modulation (PWM) control of the STC (through a PCR recovery operation) by issuing an interrupt to the MPU 18, for example.

The apparatus may also include a personal video recording (PVR) write interface unit 22, a program specific information (PSI) buffer 21 and a PVR read interface unit 23. A TS packet to be recorded (i.e., for personal video recording (PVR), referred to as a 'TS packet for PVR') may be scrambled by the CA/CP unit 14 and stored in an external hard disk drive (HDD), for example (not shown). The PVR write interface unit 22 may pack time stamp information with the TS packet for PVR. The time stamp information may include sequence header information, picture information and a current STC value (which are abstracted from the TS packet for PVR before the TS packet is scrambled by the CA/CP unit 14). PVR write interface unit 22 may output the packed TS packet for PVR (TS packet packed with time stamp information) to an external storage medium via write DMA 252, for example.

When writing a PVR stream, the PSI buffer 21 may insert program specific information off a single program into the TS packet for PVR. The PVR read interface unit 23 may receive the TS packet for PVR through the read DMA 254. The PVR read interface unit 23 may control reading speed using the time stamp information packed with the TS packet.

Within the CA/CP unit 14, and to explain how data may be prevented from being illegally copied, the data may be encrypted and stored using a key generated by an internal random number generator. A given content may be encrypted with several keys by generating a new key for each given period of time. The encryption keys may be stored with the data after the encryption keys are encrypted using a hardware key inside a chip, for example.

In a case where data is transmitted and stored in the external memory 27 using the DMAs, in an effort to reduce communication overhead with input/output (IO) devices, read and write operations may be performed at given specified fields within the external memory device 27. For example, a first given set of memory fields in external memory device 27 may be accessible by the read DMAs 254 and 255 access, and another or second set of memory fields in external memory device 27 may be accessible by the write DMAs 251-253.

Accordingly, in another exemplary embodiment, a method of reducing communication overhead in an apparatus configured to process multiple multimedia data signals, such as the exemplary apparatus of FIG. 1 may include apportioning read and write operations for accessing multimedia data within a given memory in operative communication with the exemplary apparatus. For example, the apportioning may include allocating a first given set of memory fields of a memory (such as external memory device 27) for read operations (such as for playback or viewing) and allocating a second set of memory fields in the memory for write (or record) operations.

Although described primarily in terms of hardware above, the exemplary methodologies implemented by one or more components of the exemplary apparatus described above may also be embodied in software as a computer program. For example, a program in accordance with the exemplary embodiments of the present invention may be a computer program product causing a computer to execute one or more of the exemplary methods described herein: a method of processing a plurality of multimedia data signals, a method for preventing copying of multimedia data signals that are to be recorded in an external recording medium, a method for allocating multimedia data signals within an apparatus configured to process the signals, and a method of reducing communication overhead in an apparatus configured to process multiple multimedia data signals.

The computer program product may include a computer-readable medium having computer program logic or code portions embodied thereon for enabling a processor of the apparatus to perform one or more functions in accordance with one or more of the exemplary methodologies described above. The computer program logic may thus cause the processor to perform one or more of the exemplary methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal embodied in a carrier wave. The computer data signal embodying one or more instructions or functions of the exemplary methodology may be carried on a carrier wave for transmission and/or reception by an entity that executes the instructions or functions of the exemplary methodology. For example, the functions or instructions of the exemplary embodiments may be implemented by processing one or more code segments of the carrier wave in a computer controlling one or more of the components of the exemplary apparatus of FIG. 1, where instructions or functions may be executed for processing a plurality of multimedia data signals, for preventing copying of multimedia data signals that are to be recorded in an external recording medium, for allocating multimedia data signals within an apparatus configured to process the signals, and/or for reducing communication overhead in an apparatus configured to process multiple multimedia data signals, in accordance with the exemplary methods described herein.

Further, such programs, when recorded on computer-readable storage media, may be readily stored and distributed. The storage medium, as it is read by a computer, may enable the processing of multimedia data signals prevention of copying these signals, allocation of multimedia data signals within an apparatus configured to process the signals, and/or the reduction of communication overhead in an apparatus configured to process multiple multimedia data signals, in accordance with the exemplary methods described herein.

The exemplary multiple multimedia data receiving and recording apparatus may enable several TV channels to be simultaneously viewed as moving images. Additionally, several encrypted TV channels may be simultaneously decrypted and viewed by receiving several digital multimedia signals through a single input path using time-sharing principles. Further, encrypting input signals of a TV channel prior to recording the signals may prevent illegal copying, by preventing other people from decrypting the signals when transmitting and copying the signals to other people.

A time shifting function may be realized by reading and decrypting TV channel data that is recorded in real time. Also, the accuracy at which audio with video signals may be synchronized may be improved by providing a PCR using hardware. Further, by providing separate read DMAs and write DMAs, only specific fields of an external memory may be referred to when accessing the external memory, so that arbitration for connecting to IO devices does not need to be directly performed. Therefore, hardware may be simplified.

The exemplary embodiments of the present invention being thus described, it will be obvious that the same may be varied in many ways. For example, the functional blocks of FIG. 1 describing the exemplary apparatus and/or methods may be implemented in hardware and/or software. The hardware/software implementations may include a combination of processor(s) and article(s) of manufacture. The article(s) of manufacture may further include storage media and executable computer program(s).

The executable computer program(s) may include the instructions to perform the described operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. An apparatus for processing multimedia data, comprising:
   a transport stream (TS) input switch unit configured to receive a plurality of encrypted TS packets corresponding to a plurality of digital multimedia data signals;
   a packet identification (PID) filter unit configured to receive the plurality of TS packets from the TS input switch, and to output TS packets with PID and Service Channel Identification (SCID) values set in registers of PID filters of the PID filter unit;
   a first TS buffer configured to sequentially store the output TS packets;
   an external memory device configured to store at least some of the output TS packet; and
   a conditional access/content protection (CA/CP) unit configured to read and to decrypt the encrypted TS packets stored in the first TS buffer, and to encrypt at least some of the decrypted TS packets for storage in the external memory device if the first TS buffer becomes full, so as to prevent the decrypted TS packets to be stored in the external memory device from being copied.

2. The apparatus of claim 1, further comprising:
   a second TS buffer configured to sequentially store TS packets received from the CA/CP unit; and
   a micro-processing unit (MPU) configured to sequentially read the TS packets stored in the second TS buffer, and to demultiplex the stored TS packets.

3. The apparatus of claim 1, further comprising:
   a memory interface unit operatively connected to the external memory device via an external system bus, wherein when the first TS buffer is full, a portion of the TS packets selected for output from the PID filter unit is stored, after encryption by the CA/CP unit, in the external memory device via the memory interface unit and the external system bus, in preparation for a read back process.

4. The apparatus of claim 3, further comprising:
   a program stream (PS) sector parser configured to abstract a sector header from a PS of a digital versatile disk (DVD) input through the memory interface, and to output the sector header to the CA/CP unit.

5. The apparatus of claim 3, further comprising:
   a personal video recording (PVR) write interface unit configured to receive a TS packet for PVR scrambled by the CA/CP unit, to pack the TS packet with a time stamp, and to output the packed TS packet via the memory interface unit;
   a program specific information (PSI) buffer configured to insert PSI of a single program into the TS packet for PVR when writing PVR; and
   a PVR read interface unit configured to receive the TS packet for PVR via the memory interface unit, and to control a reading speed using the time stamp information packed with the TS packet.

6. The apparatus of claim 3, wherein the memory interface unit includes a plurality of write direct memory accesses (DMAs) and a plurality of read DMAs.

7. The apparatus of claim 1, further comprising:
   a program clock reference (PCR) recovery unit configured to store PCR data abstracted from the PID filter unit and to control a system timer clock (STC) with the PCR data.

8. A method for processing multimedia data in an apparatus configured for receiving and recording a plurality of multimedia data signal, the method comprising:
- receiving a plurality of encrypted TS packets corresponding to a plurality of digital multimedia data signals;
- filtering the received plurality of TS packet and outputting TS packets having set values of a packet identification (PID) and a service channel identification (SCID);
- sequentially storing the output TS packets in a first buffer of the apparatus;
- simultaneously reading and decrypting the TS packets stored in the first buffer; and
- encrypting at least some of the decrypted TS packets in preparation for storing the encrypted packets in an external memory in communication with the apparatus, if the first buffer becomes full, so as to prevent the decrypted TS packets to be stored in the external memory from being copied.

9. A method for preventing copying of multimedia data signals that are to be recorded in an external recording medium in operative communication with an apparatus for processing multimedia data, comprising: decrypting a received plurality of encrypted transport stream (TS) packets representing one or more input multimedia data signals for storage in a buffer until the buffer is full, the received TS packets having set values of a packet identification (PID) and a service channel identification (SCID); encrypting at least some of the decrypted TS packets that cannot be stored in the buffer, and storing the encrypted TS packets in an external memory for recording in the external recording medium.

10. A computer program product comprising a computer-readable non-transitory medium having computer program logic stored thereon for enabling a processor to process multimedia data in an apparatus configured to receive and record the multimedia data, the computer program logic causing the processor to perform the functions of:
- receiving a plurality of encrypted TS packets corresponding to a plurality of digital multimedia data signals input to the apparatus;
- filtering the received plurality of TS packet and outputting TS packets having set values of a packet identification (PID) and a service channel identification (SCID);
- sequentially storing output TS packets in a first buffer of the apparatus;
- simultaneously reading and decrypting the TS packets stored in the first buffer; and
- encrypting at least some of the decrypted TS packets in preparation for storing the encrypted packets in an external memory in communication with the apparatus, if the first buffer becomes full, so as to prevent the decrypted TS packets to be stored in the external memory from being copied.

11. An apparatus for processing multimedia data, the apparatus configured for processing multimedia data in accordance with the method of claim 8.

* * * * *